United States Patent
Corsaro

(10) Patent No.: US 8,383,240 B2
(45) Date of Patent: Feb. 26, 2013

(54) ADHESION PROMOTER COMPOSITION WITH A LOW CONTENT OF VOC OR FREE OF THE SAME

(75) Inventor: Antonio Corsaro, Zürich (CH)

(73) Assignee: Sika Technology AG, Baar (CH)

( * ) Notice: Subject to any disclaimer, the term of this patent is extended or adjusted under 35 U.S.C. 154(b) by 676 days.

(21) Appl. No.: 12/310,228

(22) PCT Filed: Aug. 31, 2007

(86) PCT No.: PCT/EP2007/059129
§ 371 (c)(1),
(2), (4) Date: Mar. 10, 2009

(87) PCT Pub. No.: WO2008/025845
PCT Pub. Date: Mar. 6, 2008

(65) Prior Publication Data
US 2009/0305051 A1    Dec. 10, 2009

(30) Foreign Application Priority Data

Aug. 31, 2006  (EP) ...................... 06119857

(51) Int. Cl.
*B32B 27/40* (2006.01)
*B32B 37/12* (2006.01)
*C09K 3/00* (2006.01)

(52) U.S. Cl. ............. 428/423.1; 252/182.11; 252/182.3; 156/325

(58) Field of Classification Search .................. 156/325; 252/182.14; 523/177
See application file for complete search history.

(56) References Cited

U.S. PATENT DOCUMENTS

| | | | | |
|---|---|---|---|---|
| 3,321,350 A * | 5/1967 | Fekete | .......................... | 156/329 |
| 3,619,255 A * | 11/1971 | Lengnick | ...................... | 428/429 |
| 3,772,237 A * | 11/1973 | Bullman | ....................... | 524/188 |
| 4,059,473 A * | 11/1977 | Okami | ....................... | 156/307.3 |
| 4,173,557 A * | 11/1979 | Strecker et al. | ............... | 524/851 |
| 4,195,140 A * | 3/1980 | Sexsmith et al. | ............. | 525/523 |
| 4,900,771 A * | 2/1990 | Gerace et al. | ................ | 524/296 |
| 4,957,955 A * | 9/1990 | Saur et al. | ...................... | 524/114 |
| 5,030,673 A * | 7/1991 | Sugino et al. | ................. | 524/114 |
| 5,087,664 A * | 2/1992 | Sugino et al. | ................. | 525/124 |
| 5,223,597 A * | 6/1993 | Iwakiri et al. | ................... | 528/31 |
| 5,326,844 A * | 7/1994 | Fujiki et al. | ..................... | 528/15 |
| 5,531,814 A * | 7/1996 | Bahr et al. | ........................ | 106/3 |
| 5,567,266 A * | 10/1996 | Liu | ............................... | 156/310 |
| 5,755,866 A * | 5/1998 | Bayly et al. | ............. | 106/287.13 |
| 5,849,133 A | 12/1998 | Senderling et al. | | |
| 5,942,583 A * | 8/1999 | Azechi | .......................... | 525/403 |
| 5,973,067 A * | 10/1999 | Nakamura et al. | ............ | 524/858 |
| 6,008,305 A * | 12/1999 | Wang et al. | ............. | 525/440.03 |
| 6,107,380 A * | 8/2000 | Evans | ........................... | 524/261 |
| 6,310,170 B1 * | 10/2001 | Johnston et al. | ................ | 528/38 |
| 6,630,534 B1 * | 10/2003 | Tanaka et al. | ................. | 524/590 |
| 6,743,854 B2 * | 6/2004 | Yeats et al. | ..................... | 524/731 |
| 2003/0082925 A1* | 5/2003 | Yano et al. | .................... | 438/778 |
| 2003/0138731 A1 | 7/2003 | Fang | | |
| 2004/0074598 A1* | 4/2004 | Ando et al. | ................. | 156/325 |
| 2005/0171315 A1* | 8/2005 | Wakabayashi et al. | ......... | 528/26 |
| 2005/0215701 A1* | 9/2005 | Porsch et al. | ................. | 524/589 |
| 2005/0276964 A1* | 12/2005 | Watanabe et al. | .......... | 428/304.4 |
| 2005/0282990 A1* | 12/2005 | Schoenfeld et al. | ............ | 528/44 |
| 2006/0278338 A1* | 12/2006 | Reyes et al. | .................... | 156/326 |

FOREIGN PATENT DOCUMENTS

JP    A-2003-253210    9/2003

* cited by examiner

Primary Examiner — Robert S Loewe

(74) Attorney, Agent, or Firm — Oliff & Berridge, PLC

(57) ABSTRACT

The invention relates to bonding agent composition containing at least one bonding agent and at least one carrier medium which is liquid at room temperature and has a boiling point higher than 250° C. The carrier medium part represents between 40 and 99 wt. % of the total weight of the composition.

17 Claims, No Drawings

ADHESION PROMOTER COMPOSITION WITH A LOW CONTENT OF VOC OR FREE OF THE SAME

FIELD OF THE INVENTION

The invention pertains to the field of VOC-free or low-VOC adhesion promoter compositions.

DESCRIPTION OF THE PRIOR ART

Adhesion promoter compositions, in the form more particularly of primers or adhesion promoter undercoats, have been utilized for a long time to improve the adhesion of adhesives, sealants, coatings, and coverings to the substrate. Silanes, titanates and/or zirconates are used typically as adhesion promoters in such compositions.

There are usually large amounts of volatile solvents in such adhesion promoter compositions. Increasingly, however, such adhesion promoter compositions are coming under pressure on account of the large volumes of volatile solvents (VOC; volatile organic compounds) which are released on application. Within the market, therefore, there is a great need for VOC-free or at least low-VOC adhesion promoter compositions.

SUMMARY OF THE INVENTION

It is an object of the present invention, therefore, to provide an adhesion promoter composition which contains no volatile solvents as an essential constituent and which nevertheless, more particularly in the form of a primer or an adhesion promoter undercoat, can be contacted after just a short time with an adhesive, sealant, coating or covering composition.

It has emerged that an adhesion promoter composition in accordance with claim 1 is able to achieve this object. These adhesion promoter compositions exhibit very good adhesion to a variety of substrates, including glass and ceramic in particular, and so are especially well suited to the bonding of glazing sheets in vehicle construction. It has additionally been found, surprisingly, that an adhesive or the sealant in the majority of cases can even be applied directly to the film of adhesion promoter composition while the latter is still moist, i.e., "wet on wet", without this having notable drawbacks in adhesion or in the mechanical properties of the cured sealant or adhesive.

DESCRIPTION OF THE PREFERRED EMBODIMENTS

The present invention provides adhesion promoter compositions which comprise at least one adhesion promoter and also at least one carrier material which is liquid at room temperature. The carrier material which is liquid at room temperature has a boiling point of greater than 250° C. under standard pressure or a vapor pressure of less than 0.1 mbar at 20° C.

The fraction of the carrier material, moreover, is 40%-99% by weight, based on the total weight of the composition.

In the present document the term "liquid at room temperature" means "self-flowing at 25° C.".

There are a very large number of different definitions of volatile organic compounds or VOC. Thus, for example, according to the EU Directive 2004/42/EC, VOC is defined as being an organic compound having a boiling point of not more than 250° C. under a standard pressure of 101.3 kPa. According to the Swiss ordinance concerning the steering tax on volatile organic compounds, VOCs are defined as being organic compounds having a vapor pressure of at least 0.1 mbar at 20° C. or a boiling point of not more 240° C. at 1013.25 mbar. The present document considers volatile organic compounds or VOCs to be organic compounds which have a boiling point of not more 250° C. under standard pressure (1013 mbar) or a vapor pressure of at least 0.1 mbar at 20° C.

The adhesion promoter composition comprises an adhesion promoter. Preferably the adhesion promoter is selected from the group consisting of organosilicon compounds, organotitanium compounds, organozirconium compounds, and mixtures thereof.

The organosilicon compound here contains at least one hydroxyl group, alkoxy group or acyloxy group attached to a silicon atom, and also at least one organic substituent attached via a carbon-silicon bond to a silicon atom. The organotitanium compound here has at least one substituent attached via an oxygen-titanium bond to the titanium atom. The organozirconium compound here has at least one substituent attached via an oxygen-zirconium bond to the zirconium atom.

Particularly suitable organosilicon compounds are organosilicon compounds of the formulae (I) or (II) or (III)

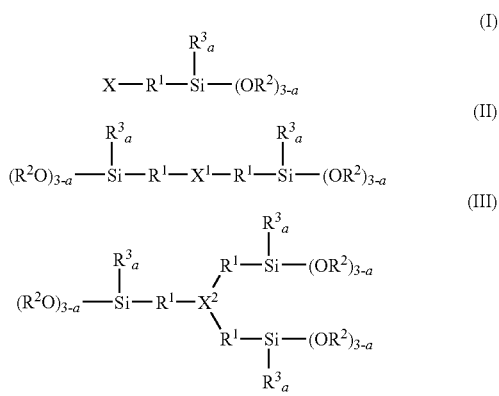

$R^1$ here is a linear or branched, optionally cyclic, alkylene group having 1 to 20 C atoms, optionally with aromatic fractions, and optionally with one or more heteroatoms, more particularly nitrogen atoms.

$R^2$ here is H or is an alkyl group having 1 to 5 C atoms, more particularly methyl or ethyl, or an acyl group, more particularly acetyl.

$R^3$ here is an alkyl group having 1 to 8 C atoms, more particularly methyl.

X here is H, or is a functional group which is selected from the group encompassing oxirane, OH, (meth)-acryloyloxy, amine, SH, acylthio, and vinyl, preferably amine. For the sake of completeness it is noted that by acylthio in this document is meant the substituent

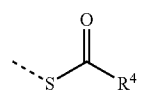

where $R^4$ is alkyl, more particularly having 1 to 20 carbon atoms, and the dashed line represents the bond to the substituent $R^1$.

$X^1$ here is a functional group which is selected from the group encompassing NH, S, $S_2$, and $S_4$.

$X^2$ here is a functional group which is selected from the group encompassing N and isocyanurate.

a here is one of the values 0, 1 or 2, preferably 0.

The substituent $R^1$ is more particularly a methylene, propylene, methylpropylene, butylene or dimethyl-butylene group. Propylene group is a particularly preferred substituent $R^1$.

Organosilicon compounds containing amino, mercapto or oxirane groups are also referred to as aminosilanes, mercaptosilanes or epoxysilanes.

Examples of suitable organosilicon compounds of the formula (I) are the organosilicon compounds selected from the group encompassing octyltrimethoxysilane, dodecyltrimethoxysilane, hexa-decyltrimethoxysilane, methyloctyldimethoxysilane; 3-glycidyloxypropyltrimethoxysilane, 3-glycidyloxy-ptopyltriethoxysilane, 3-methadryloyloxypropyltri-alkoxysilanes, 3-methacryloyloxypropyltriethoxysilane, 3-methacryloyloxypropyltrimethoxysilane; 3-aminopropyltrimethoxysilane, 3-aminopropyltriethoxy-silane, 3-aminopropyldimethoxymethylsilane, 3-amino-2-methylpropyltrimethoxysilane, N-(2-aminoethyl)-3-aminopropyltrimethoxysilane, N-(2-aminoethyl)-3-aminopropyltriethoxysilane, N-(2-aminoethyl)-3-aminopropyldimethoxymethylsilane, 4-aminobutyltrimethoxysilane, 4-aminobutyldimethoxymethylsilane, 4-amino-3-methylbutyltrimethoxysilane, 4-amino-3,3-dimethylbutyltrimethoxysilane, 4-amino-3,3-dimethylbutyldimethoxymethylsilane, [3-(2-aminoethylamino)propyl]trimethoxysilane (i.e., 4,7,10-triazadecyltrimethoxysilane), 2-aminoethyltrimethoxysilane, 2-aminoethyldimethoxy-methylsilane, aminomethyltrimethoxysilane, aminomethyldimethoxymethylsilane, aminomethylmethbxydimethylsilane, 7-amino-4-oxaheptyldimethoxymethylsilane, N-(methyl)-3-aminopropyltrimethoxysilane, N-(n-butyl)-3-amino-propyltrimethoxysilane; 3-mercaptopropyltriethoxysilane, 3-mercaptopropyltri-methoxysilane, 3-mercaptopropylmethyldimethoxysilane; 3-acylthiopropyltrimethoxysilane; vinyltrimethoxysilane and vinyltriethoxysilane.

Also preferred are the organosilicon compounds as just specified whose alkoxy groups have been replaced by acetoxygroups, such as, for example, octyltriacetoxysilane (octyl-Si(O(O=C)CH$_3$)$_3$). Organosilicon compounds of this kind give off acetic acid on hydrolysis.

Among these stated organosilicon compounds preference is given to those that have an organic substituent attached to the silicon atom and that additionally contain a functional group, i.e., a group which is not an alkyl group, and conform to a formula (I) in which X is not H.

Examples of suitable organosilicon compounds of the formula (II) are the organosilicon compounds selected from the group encompassing bis[3-(trimethoxy-silyl)propyl]amine, bis[3-(triethoxysilyl)propyl]amine, 4,4,15,15-tetraethoxy-3,16-dioxa-8,9,10,11-tetrathia-4-15-disilaoctadecane, (bis(triethoxysilylpropyl)poly-sulfide or bis(triethoxysilylpropyl) tetrasulfane), bis(triethoxysilylpropyl) disulfide.

Examples of suitable organosilicon compounds of the formula (III) are the organosilicon compounds selected from the group encompassing tris[3-(trimethoxy-silyl)propyl]amine, tris[3-triethoxysilyl)propyl]amine, 1,3,5-tris[3-(trimethoxysilyl)propyl]-1,3,5-triazine-2,4,6-(1H,3H,5H)trione-urea (i.e., tris(3-(trimethoxy-silyl)propyl)isocyanurate) and 1,3,5-tris[3-triethoxy-silyl)propyl]-1,3,5-triazine-2,4,6(1H,3H, 5H)trione-urea (i.e., tris(3-(triethoxysilyl)propyl)isocyanurate).

Preferred organosilicon compounds are aminosilanes, especially aminosilanes with X=NH$_2$ or NH$_2$—CH$_2$—CH$_2$—NH, $X^1$=NH and $X^2$=N. Particular preference is given to 3-aminopropyltrimethoxysilane, N-(2-aminoethyl)-3-aminopropyltrimethoxysilane, bis[3-(trimethoxysilyl)-propyl]amine, 3-aminopropyltriethoxysilane, N-(2-aminoethyl)-3-aminopropyltriethoxysilane, and bis[3-triethoxysilyl)propyl]amine, and also their mixtures with one another.

Particularly suitable substituents attached via an oxygen-titanium bond to the titanium atom are those which are selected from the group encompassing alkoxy group, sulfonate group, carboxylate group, dialkyl phosphate group, dialkyl pyrophosphate group, and acetylacetonate group.

Particularly suitable compounds are those in which all of the substituents attached to the titanium are selected from the group encompassing alkoxy group, sulfonate group, carboxylate group, dialkyl phosphate group, dialkyl pyrophosphate group, and acetylacetonate group, it being possible for all of the substituents to be identical or different from one another.

Alkoxy groups which have proven particularly suitable are, in particular, those known as neoalkoxy substituents, more particularly of the following formula (IV):

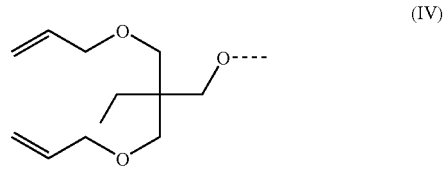

(IV)

Sulfonic acids which have proven particularly suitable are, in particular, aromatic sulfonic acids whose aromatic moieties are substituted by an alkyl group. Preferred sulfonic acids are radicals of the following formula (V):

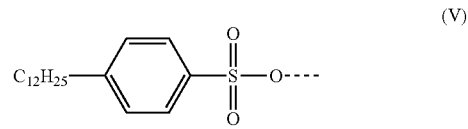

(V)

Carboxylates of fatty acids, in particular, have proven particularly suitable as carboxylate groups. Decanoate is a preferred carboxylate.

In the formulae above, the dashed line represents the bond of the oxygen to the titanium.

Organotitanium compounds are available commercially, from Kenrich Petrochemicals or DuPont, for example. Examples of suitable organotitanium compounds are, for example, Ken-React® KR TTS, KR 7, KR 9S, KR 12, KR 26S, KR 33DS, KR 38S, KR 39DS, KR44, KR 134S, KR 138S, KR 158FS, KR212, KR 238S, KR 262ES, KR 138D, KR 158D, KR238T, KR 238M, KR238A, KR238J, KR262A, LICA 38J, KR 55, LICA 01, LICA 09, LICA 12, LICA 38, LICA 44, LICA 97, LICA 99, KR OPPR, KR OPP2 from Kenrich Petrochemicals or Tyzor® ET, TPT, NPT, BTM, AA, AA-75, AA-95, AA-105, TE, ETAM, OGT from DuPont.

Preference is given to Ken-React® KR 7, KR 9S, KR 12, KR 26S, KR 38S, KR44, LICA 09, LICA 44, NZ 44, and also Tyzor® ET, TPT, NPT, BTM, AA, AA-75, AA-95, AA-105, TE, ETAM from DuPont.

Particularly preferred organotitanium compounds are those having substituents of the formulae (IV) and/or (V) attached via an oxygen-titanium bond to the titanium atom.

Particularly suitable organozirconium compounds are those which carry at least one functional group which is selected from the group encompassing alkoxy group, sulfonate group, carboxylate group, phosphate or mixtures thereof and which is attached via an oxygen-zirconium bond directly to a zirconium atom.

Alkoxy groups which have proven particularly suitable are, in particular, isopropoxy and those known as neoalkoxy substituents, more particularly of the following formula (IV):

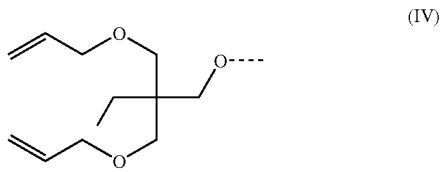

(IV)

Sulfonic acids which have proven particularly suitable are, in particular, aromatic sulfonic acids whose aromatic moieties are substituted by an alkyl group. Preferred sulfonic acids are radicals of the following formula (V):

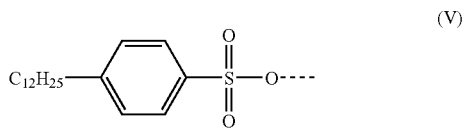

(V)

Carboxylates of fatty acids, in particular, have proven particularly suitable as carboxylate groups. Stearates and isostearates are preferred carboxylates.

In the formulae above, the dashed line represents the bond of the oxygen to the zirconium.

Organozirconium compounds are available commercially, from Kenrich Petrochemicals, for example. Examples of suitable organotitanium compounds are, for example, Ken-React® NZ 38J, NZ TPPJ, KZ OPPR, KZ TPP, NZ 01, NZ 09, NZ 12, NZ38, NZ 44, NZ 97.

It is clear to the person skilled in the art that, under the influence of water, these organosilicon compounds, organotitanium compounds, and organozirconium compounds undergo hydrolysis and form OH groups attached to the Si, Ti or Zr atom. Hydrolyzed or partly hydrolyzed organosilicon compounds, organotitanium compounds, and organozirconium compounds of this kind can then in turn undergo condensation to form condensation products which contain Si—O—Si, Ti—O—Ti, Zr—O—Zr bonds. Where silanes and/or titanates and/or zirconates are mixed as adhesion promoters, mixed condensation products are also possible which contain Si—O—Ti, Si—O—Zr or Ti—O—Zr bonds. A small fraction of such condensation products is possible, particularly if they are soluble, emulsifiable or dispersible.

The adhesion promoter composition preferably comprises at least one organosilicon compound and at least one organotitanium compound.

The combination of at least one organosilicon compound and at least one organotitanium compound in the adhesion promoter composition is particularly advantageous insofar as in this case, in particular, the spectrum of the substrates on which an improvement in adhesion is obtained is enlarged. It has been found, moreover, that such a combination has advantageous consequences for the adhesion following storage in water or storage under conditions of combined heat and humidity.

The adhesion promoter composition further comprises at least one carrier material which is liquid at room temperature and has a boiling point of greater than 250° C. under standard pressure or a vapor pressure of less than 0.1 mbar at 20° C. The carrier material is therefore not a VOC in accordance with the definition used in this document.

Suitable carrier materials are, on the one hand, plasticizers having a boiling point of greater than 250° C. under standard pressure or a vapor pressure of less than 0.1 mbar at 20° C.

More particularly the plasticizers are selected from the group consisting of esters of phthalic acids, esters of aliphatic dicarboxylic acid, and fatty acid esters, and organic esters of phosphoric acids. Particularly suitable esters of phthalic acids are the dialkyl phthalates, preferably the diesters of phthalic acid and of $C_8$-$C_{16}$ alcohols, more particularly dioctyl phthalate (DOP), diisononyl phthalate (DINP), and diisodecyl phthalate (DIDP).

Esters of aliphatic dicarboxylic acids are more particularly the esters of adipic acid or of sebacic acid, such as dioctyl adipate (DOA), diisodecyl adipate (DIDA).

It is also possible for polyesters to be able to be used, such as polyesters of adipic acid or sebacic acid with diols, such as hexanediol or butanediol, for example, with the proviso that these polyesters are liquid at room temperature.

Suitable carrier materials are, on the other hand, organic solvents having a boiling point of greater than 250° C. under standard pressure or a vapor pressure of less than 0.1 mbar at 20° C.

More particularly the carrier material in question is a solvent selected from the group consisting of ethers, esters, hydrocarbons, ketones, aldehydes, and amides.

Ethers are, in particular, alkoxy-capped polyols, especially alkoxy-capped polyoxyalkylene polyols, also called alkoxy-terminated polyether polyols. Examples of such are polypropylene glycol dialkyl ethers or polyethylene glycol dialkyl ethers. Examples thereof are tetraglyme (tetraethylene glycol dimethyl ether), pentaglyme (pentaethylene glycol dimethyl ether), hexaglyme (hexaethylene glycol dimethyl ether), polyethylene glycol dimethyl ethers, of the kind, for example, sold commercially by Clariant under the names Polyglykol DME 200 or Polyglykol DME 250, diethylene glycol dibutyl ether, polypropylene glycol dimethyl ethers, polypropylene glycol dibutyl ethers, polyethylene glycol monomethyl ether monoacetate, and polypropylene glycol monomethyl ether monoacetate. Polypropylene glycol diethers have the advantage over the corresponding polyethylene glycol diethers that they typically possess a better solution behavior and are also still liquid at higher molecular weights.

Particularly suitable esters are esters of carbonic acid or monocarboxylic acids or polycarboxylic acids. Esters of carbonic acid include in particular the dialkyl carbonates.

Esters of monocarboxylic acids include, in particular, esters of low molecular mass monocarboxylic acids, especially $C_1$ to $C_6$ carboxylic acids, with fatty alcohols, and also esters of low molecular mass alcohols, especially $C_1$ to $C_6$ alcohols, with fatty acids. Examples thereof are methyl laurate, ethyl laurate, methyl myristate, and lauryl acetate.

Additionally suitable are esters of carboxylic acids with polyethylene glycols or polypropylene glycols.

Additionally suitable esters are organic phosphonates and phosphates.

Additionally suitable are cyclic esters, i.e., lactones.

Suitable amides are, in particular, fatty acid amides or cyclic amides, i.e., lactams.

All of these solvents are governed by the proviso that they are liquid at room temperature.

It is particularly advantageous if the carrier material contains no reactive groups. More particularly no groups which react with the adhesion promoter. Most preferably the carrier material contains no isocyanate-reactive groups.

It is of advantage if the carrier material which is liquid at room temperature is a solvent which is capable of dissolving the adhesion promoters.

It may be entirely advantageous, particularly if the adhesion promoters are insoluble or lack sufficient solubility in the carrier material, for surfactants, more particularly in the form as an emulsifier and/or co-emulsifier, to be constituents of the adhesion promoter compositions.

Additionally it may be advantageous if the composition comprises a filler. The filler may be organic or inorganic. It is particularly advantageous if the filler has a particle diameter of less than 100 micrometers, more particularly of less than 1 micrometer. Particular preference is given to carbon blacks, chalk, especially coated chalks, and different forms of silicon dioxide, such as finely ground quartz, colloidal or fumed silicas, preferably fumed silicas. The most preferred filler is carbon black. The use of fillers is suitable in particular for the mechanical reinforcement of the adhesion promoter composition. It is possible, furthermore, to realize higher-build applications using fillers.

When the adhesion promoter composition is a primer it is advantageous to use at least one organic binder as well. This may be, for example, an epoxy resin, an isocyanate-containing prepolymer or poly(meth)-acrylates.

The composition may additionally also contain further constituents as well. In particular these are pigments, dyes, fluorescent indicators, flow control additives, biocides, especially algicides or fungicides, thixotropic agents, flame retardants, catalysts, especially acids, and organometallic salts or complexes, stabilizers.

The adhesion promoter composition preferably contains a fraction of all the adhesion promoters of 1%-25% by weight, more particularly 1%-15% by weight, more preferably 1%-10% by weight, based on the total weight of the composition.

The fraction of the filler is preferably 1%-25% by weight, more particularly 1%-15% by weight, more preferably 1%-10% by weight, based on the total weight of the composition.

It is clear to the person skilled in the art that due to the use of adhesion promoters, more particularly of organosilicon compounds of the formulae (I) or (II) or (III), the adhesion promoter composition, due to the adhesion promoters, and also due to the hydrolysis products that are formed in the case of a hydrolysis, such as ethanol or methanol, the adhesion promoter composition is generally not entirely free from VOC. It is nevertheless desirable for the VOC content to be as low as possible. In particular it is advantageous if the adhesion promoter composition comprises less than 5% by weight, more particularly 0% to 2% by weight, preferably 0% to 1% by weight, most preferably 0% by weight, based in each case on the total weight of the composition, of VOC, i.e., of organic substances which possess a boiling point of less than 250° C. under standard pressure or a vapor pressure of greater than 0.1 mbar at 20° C.

The fraction of the carrier material is preferably 55%-99% by weight, more particularly 70%-99% by weight, based on the total weight of the composition.

The adhesion promoter compositions have diverse possible uses. In one particularly preferred embodiment they represent a primer or an adhesion promoter undercoat.

In a further aspect the present invention provides a method of adhesive bonding or of sealing. This method comprises the following steps:
i) applying an adhesion promoter composition as described above to a substrate S1 to be bonded or sealed
ii) applying an adhesive or sealant to the composition which is on the substrate S1
iii) contacting the adhesive or sealant with a second substrate S2;
or
i') applying an adhesion promoter composition as described above to a substrate S1 to be bonded or sealed
ii') applying an adhesive or sealant to the surface of a second substrate S2
iii') contacting the adhesive or sealant with the composition which is on the substrate S1;
or
i') applying an adhesion promoter composition as described above to a substrate S1 to be bonded or sealed
ii") applying an adhesive or sealant between the surfaces of substrates S1 and S2.

The second substrate S2 here is composed of the same or a different material to the substrate S1.

Typically step iii), iii') or ii") is followed by a step iv) of curing the adhesive or sealant.

The adhesive or sealant used may in principle be any adhesive or sealant. The selection is guided by factors including the open time and the mechanical requirements imposed on the assembly formed. It has been found that this method is especially good for polyurethane adhesives or sealants, particularly for polyurethane adhesives which comprise at least one polyurethane prepolymer containing isocyanate groups. Such polyurethane adhesives cure under the influence of atmospheric moisture via a crosslinking reaction of the isocyanate groups and are widely available commercially, more particularly under the name Sikaflex® from Sika Schweiz AG.

Step ii), ii') or ii") may be preceded if necessary by a step of wiping off with a dry cloth.

Application of the adhesive or sealant can wait until the adhesion promoter composition has undergone evaporation. It has emerged surprisingly, however, that in the majority of cases the adhesive or the sealant can be applied even directly to the adhesion promoter composition film while the latter is still moist, i.e., wet on wet, without notable disadvantages in the adhesion or in the mechanical properties of the cured sealant or adhesive.

The substrate S1 may be identical or different from substrate S2.

Suitable substrates S1 or S2 are, for example, inorganic substrates such as glass, glass ceramic, concrete, mortar, brick, tile, plaster, and natural stone such as granite or marble; metals or alloys such as aluminum, steel, nonferrous metals, galvanized metals; organic substrates such as wood, plastics such as PVC, polycarbonates, PMMA, polyesters, epoxy resins; coated substrates such a powder-coated metals or alloys; and also paints and varnishes. Particularly preferred substrates S1 or S2 are glass, glass ceramic, aluminum, and finishes, more particularly in the form of an automobile finish.

Where necessary, the substrates may be pretreated before the adhesive or sealant is applied. Pretreatments of this kind encompass, in particular, physical and/or chemical cleaning techniques, examples being abrading, sandblasting, brushing or the like, or treatment with cleaners or solvents, or the application of an adhesion promoter, an adhesion promoter solution or a primer.

A method of this kind for adhesive bonding or for sealing results in an article. Since the method can be employed widely, for example, in industrial manufacture or in construction or civil engineering, these articles as well are very diverse in their nature.

The article in question is more particularly an article which is a built structure, an industrial product or a means of transport. More particularly it represents a building or a part thereof. Alternatively the article is in particular a means of transport, more particularly an automobile, bus, truck, rail vehicle, boat or aircraft.

EXAMPLES

The following adhesion promoter compositions were prepared in accordance with Table 1, by adding the adhesion promoter to the carrier material and stirring the components well under nitrogen.

The following substances and designations were used:

| Trade name (abbreviation for Table 1) | Chemical identification | Manufacturer |
|---|---|---|
| Tetraethyleneglycoldimethylether (TTEG-DME) | Tetraethyleneglycol-dimethylether | Clariant |
| Dipropyleneglycoldimethylether (DPG DME) | Dipropyleneglycoldimethylether bis(trimethoxysilylpropyl)-amine | Clariant |
| Silquest ® A1170 (A1170) | N-(2-aminoethyl)-3-aminopropyl-trimethoxysilane | GE Silicones |
| Dynasylan ® DAMO-T (DAMO) | 3-mercaptopropyltrimethoxysilane | Degussa |
| Silquest ® A189 (A189) | 3-glycidyloxypropyltrimethoxysilane | GE Silicones |
| Silquest ® A187 (A187) | Isopropyltridodecylbenzene-sulfonyl titanate = titanium-tris (dodecylbenzenesulfonate) | GE Silicones |
| Ken-React ® KR9S (KR9S) | isopropoxide [61417-55-8] surfactant | Kenrich Petrochemical |
| BYK 33 (BYK33) | | BYK Chemie |

The adhesion promoter compositions were placed in tightly closing glass bottles and after 1 day of storage at room temperature were used for the adhesion tests.

TABLE 1

Compositions of adhesion promoter compositions (amounts in % by weight)

| | Ref. 1 | 1 | 2 | 3 |
|---|---|---|---|---|
| TTEG-DME | | 96 | 95 | 92.5 |
| DPG DME | 96 | | | |
| A1170 | 2 | 2 | 2 | |
| DAMO | | | | 2.3 |
| A189 | | | 1 | |
| A187 | | | | 2.7 |
| KR9S | 2 | 2 | 2 | 2 |
| BYK 33 | | | | 0.5 |

The comparative composition Ref. 1 contains dipropylene glycol dimethyl ether as carrier material. This carrier material has a boiling point of 175° C. under standard pressure and a vapor pressure of 0.77 mbar at 20° C. and is therefore a VOC in accordance with the definition used in this document. Tetraethylene glycol dimethyl ether, on the other hand, has a boiling point of 275° C. under standard pressure and a vapor pressure of less than 0.01 mbar and is therefore not a VOC.

The compositions were then applied to various substrates, using a cellulose cloth soaked with them (Tela®, Tela-Kimberly Switzerland GmbH). After 5 seconds they were wiped off with a dry cellulose cloth. Subsequently, within 10 minutes, a circular bead of SikaTack® Move Goes Cool (ST-MGC) was applied by means of an extrusion cartridge and nozzle. SikaTack® Move Goes Cool is a one-component, moisture-curing polyurethane adhesive which comprises polyurethane prepolymers with isocyanate groups and is available commercially from Sika Schweiz AG.

The adhesive was tested after a cure time of 7 days' controlled-atmosphere chamber storage (CS) (23° C., 50% relative humidity), and after subsequent water storage (WS) in water at 23° C. for 7 days, and after subsequent heat/humidity storage (HS) of 7 days at 70° C., 100% relative humidity.

The adhesion of the adhesive was tested by means of the bead test. In this test the bead is incised at the end, just above the bond face. The incised end of the bead is gripped with round-end tweezers and pulled from the substrate. This is done by carefully rolling the bead up onto the tip of the tweezers, and placing a cut vertically to the bead-pulling direction, down to the bare substrate. The rate of bead removal is selected such that a cut has to be made about every 3 seconds. The test length must be at least 8 cm. The parameter assessed is the adhesive that remains on the substrate after the bead has been removed (cohesive fracture). The adhesion properties are evaluated by visual determination of the cohesive fraction of the adhesion face:

the higher the fraction of cohesive fracture, the better the estimated bonding. Test results with cohesive fractures of less than 50%, more particularly less than 30%, are typically considered to be inadequate.

The following substrates were used:

Floatglass (tin side used for adhesion test), Rocholl, Germany

VSG ceramic, Ferro 14279, Rocholl, Germany

ESG ceramic, Ferro 14251, Rocholl, Germany.

All of the substrates were cleaned immediately prior to the application of the adhesion promoter composition by being wiped using a cellulose cloth (Tela®) which had been soaked with a mixture of isopropanol and water (2:1), and were left to evaporate for at least 2 minutes prior to the application of the adhesion promoter composition.

Table 2 shows the adhesion results of the compositions on different substrates after different forms of storage.

TABLE 2

Adhesion results of STMGC after pretreatment with different adhesion promoter compositions.

| | Glass | | | ESG ceramic | | | VSG ceramic | | |
|---|---|---|---|---|---|---|---|---|---|
| | CS | WS | HS | CS | WS | HS | CS | WS | HS |
| Ref. 1 | 95 | 0 | 0 | n.m.[1] | n.m.[1] | n.m.[1] | n.m.[1] | n.m.[1] | n.m.[1] |
| 1 | 100 | 100 | 100 | 100 | 100 | 100 | 100 | 100 | 100 |
| 2 | 100 | 100 | 100 | 100 | 100 | 100 | 100 | 100 | 100 |
| 3 | 50 | 50 | 100 | 100 | 100 | 100 | 100 | 100 | 100 |

[1] n.m. = not measured.

For Table 3 the procedure was the same as for Table 2, but the adhesion promoter composition 1 was applied by means of a cellulose cloth soaked with it and thereafter, within a minute, a circular bead of SikaTack® Move Goes Cool was applied directly wet on wet. For Table 2, therefore, there was no wiping off with a dry cellulose cloth.

TABLE 3

Adhesion results of STMGC after pretreatment with adhesion promoter composition 1, without wipe off.

| | Glass | | | ESG ceramic | | | VSG ceramic | | |
|---|---|---|---|---|---|---|---|---|---|
| | CS | WS | HS | CS | WS | HS | CS | WS | HS |
| 1 | 100 | 100 | 100 | 100 | 100 | 100 | 100 | 100 | 100 |

In accordance with the tests of Tables 2 and 3, furthermore, adhesive bonds were produced with glass, ESG ceramic or VSG ceramic, and aluminum. In these cases it was found that examples 1, 2, and 3 achieved a strong adhesive bond, whereas the adhesive bond in the case of Ref. 1 after water storage and particularly after heat/humidity storage was easy to separate.

The invention claimed is:

1. An adhesion promoter composition comprising
    an adhesion promoter, said adhesion promoter comprising at least one organosilicon compound and at least one organotitanium compound,
    said adhesion promoter composition further comprising at least one carrier material which is liquid at room temperature and has a boiling point of greater than 250° C. under standard pressure or a vapor pressure of less than 0.1 mbar at 20° C.; and
    a surfactant,
    wherein the fraction of the carrier material is 70%-99% by weight, based on the total weight of the composition.

2. The adhesion promoter composition of claim 1, wherein the fraction of all the adhesion promoters is 1%-25% by weight, based on the total weight of the composition.

3. The adhesion promoter composition of claim 1, wherein the adhesion promoter composition further comprises at least one filler.

4. The adhesion promoter composition of claim 3, wherein the fraction of the filler is 1%-25% by weight, based on the total weight of the composition.

5. The adhesion promoter composition of claim 1, wherein the carrier material contains no isocyanate-reactive groups.

6. The adhesion promoter composition of claim 1, wherein the adhesion promoter composition comprises less than 5% by weight, based on the total weight of the composition, of organic substances which possess a boiling point of less than 250° C. under standard pressure or a vapor pressure of greater than 0.1 mbar at 20° C.

7. The adhesion promoter composition of claim 1, wherein the carrier material which is liquid at room temperature is a solvent which is capable of dissolving the at least one adhesion promoter.

8. The adhesion promoter composition of claim 1, wherein the carrier material which is liquid at room temperature is a plasticizer.

9. The adhesion promoter composition of claim 1, wherein the adhesion promoter further includes organozirconium compounds.

10. The adhesion promoter composition of claim 9 wherein the organosilicon compound has the formula (I), (II) or (III)

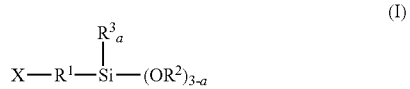
(I)

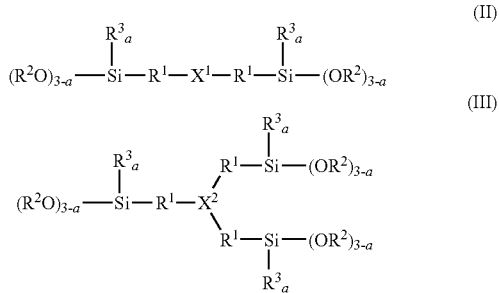

where $R^1$ is a linear or branched, optionally cyclic, alkylene group having 1 to 20 C atoms, optionally with aromatic fractions, and optionally with one or more heteroatoms, especially nitrogen atoms; and $R^2$ is H or is an alkyl group having 1 to 5 C atoms, more particularly methyl or ethyl, or an acyl group; and $R^3$ is an alkyl group having 1 to 8 C atoms, more particularly methyl; and X is H, or is a functional group which is selected from the group encompassing oxirane, OH, (meth)acryloyloxy, amine, SH, acylthio, and vinyl, preferably amine; and $X^1$ is a functional group which is selected from the group encompassing NH, S, $S_2$, and $S_4$; and $X^2$ is a functional group which is selected from the group encompassing N and isocyanurate; and a is one of the values 0, 1 or 2, preferably 0.

11. The adhesion promoter composition of claim 1, wherein the adhesion promoter comprises at least two organosilicon compounds.

12. A method of adhesive bonding or of sealing, comprising the steps of
    i) applying the adhesion promoter composition of claim 1 to a substrate S1 to be bonded or sealed
    ii) applying an adhesive or sealant to the composition which is on the substrate S1
    iii) contacting the adhesive or sealant with a second substrate S2;
or
    i') applying the adhesion promoter composition of claim 1 to a substrate S1 to be bonded or sealed
    ii') applying an adhesive or sealant to the surface of a second substrate S2
    iii') contacting the adhesive or sealant with the composition which is on the substrate S1;
or
    i") applying the adhesion promoter composition of claim 1 to a substrate S1 to be bonded or sealed
    ii") applying an adhesive or sealant between the surfaces of substrates S1 and S2,
    the second substrate S2 being composed of the same or a different material to the substrate S1.

13. The method of claim 12, wherein the step iii), iii') or ii") is followed by a step iv) of curing the adhesive or sealant.

14. The method of claim 12, wherein the adhesive or sealant is a polyurethane adhesive which comprises at least one polyurethane prepolymer containing isocyanate groups.

15. An article produced by executing a method of claim 12.

16. The article of claim 15, wherein the article is a built structure, an industrial product or a means of transport, or a part thereof.

17. The article of claim 16, wherein the article is a means of transport.

* * * * *